(12) United States Patent
Fujiwara

(10) Patent No.: US 6,822,721 B2
(45) Date of Patent: Nov. 23, 2004

(54) LIQUID CRYSTAL DISPLAY DEVICE

(75) Inventor: Norio Fujiwara, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 9 days.

(21) Appl. No.: 10/378,350

(22) Filed: Mar. 3, 2003

(65) Prior Publication Data

US 2003/0210374 A1 Nov. 13, 2003

(30) Foreign Application Priority Data

Mar. 27, 2002 (JP) .......................................... 2002-087851

(51) Int. Cl.$^7$ ............................................... G02F 1/13
(52) U.S. Cl. ...................................................... 349/161
(58) Field of Search ..................... 349/161, 58

(56) References Cited

U.S. PATENT DOCUMENTS

| 5,757,443 | A | * | 5/1998 | Kobayashi | ...................... 349/5 |
| 5,926,243 | A | * | 7/1999 | Kim | ........................... 349/138 |
| 6,535,267 | B2 | * | 3/2003 | Numata et al. | .............. 349/161 |

FOREIGN PATENT DOCUMENTS

JP    6-2310 79    8/1994

* cited by examiner

*Primary Examiner*—James A. Dudek
(74) *Attorney, Agent, or Firm*—RatnerPrestia

(57) ABSTRACT

A liquid crystal display (LCD) device includes a case, an LCD unit accommodated in the case, and a heat insulating member provided between the LCD unit and the case. In the LCD device, even if a rear side or a display side is exposed to direct sunlight, heat is not transmitted to a liquid crystal material of the LCD unit, and the device is prevented from being darkened by heat.

10 Claims, 6 Drawing Sheets

LIQUID CRYSTAL DISPLAY DEVICE

FIELD OF THE INVENTION

The present invention relates to a liquid crystal display device used in notebook personal computers and personal data assistants.

BACKGROUND OF THE INVENTION

A conventional liquid crystal display (LCD) device 6 used in notebook personal computer or personal data assistant is, as shown in a sectional view in FIG. 5, a liquid crystal display (LCD) unit 5 includes a liquid crystal material 1, a glass substrate 2 enclosing the liquid crystal material 1, a light guide plate 3 made of acrylic material or the like provided at its back, and a fluorescent light (FL) tube 4 as a light source for back-lighting provided at its end. The LCD unit 5 is covered with a front case 6a and a rear case 6b made of ABS resin, magnesium alloy or the like. Or, as shown in a sectional view in FIG. 6, a translucent touch panel device 7 is provided on LCD unit 5, and they are covered with a front case 6a and a rear case 6b made of ABS resin, magnesium alloy or the like. In any case, a side to the front case 6a is the display panel side of the LCD device 6, and a side to the rear case 6b is the rear side of the device. For explanation, the front case 6a and rear case 6b are shown separately, but actually, they are joined and assembled together with screws or the like.

Recently, portability of notebook personal computers and personal data assistants is enhanced, and they are often used outdoors. This type of information appliance usually includes a personal computer main body, and an LCD device attached to the personal computer main body, and the device is designed to open and close. Therefore, upon being used under the direct sunlight, the information appliance has the rear side exposed to the direct sunlight when the LCD device 6 is closed, or the display panel side is exposed when being opened. Therefore, the radiation heat of the sun is transmitted to the glass substrate 2 of the LCD unit 5, and the heat is further transmitted from the glass substrate 2 to the liquid crystal material 1. This raises the temperature of the liquid crystal material 1, and prevents the twisting state of the liquid crystal material 1 from being controlled due to the high temperature. Thus, light hardly passes through the material even if lighting, and becomes dark and invisible.

SUMMARY OF THE INVENTION

A liquid crystal display (LCD) device includes a case, a liquid crystal display (LCD) unit accommodated in the case, and a heat insulating member disposed between the liquid crystal display unit and the case.

Even if having a rear side or display panel side exposed to a direct sunlight, the LCD device has its liquid crystal material not transmitted to, and has its displaying state not change by heat.

DESCRIPTION OF THE PREFERRED EMBODIMENTS

Exemplary Embodiment 1

Figure 1:
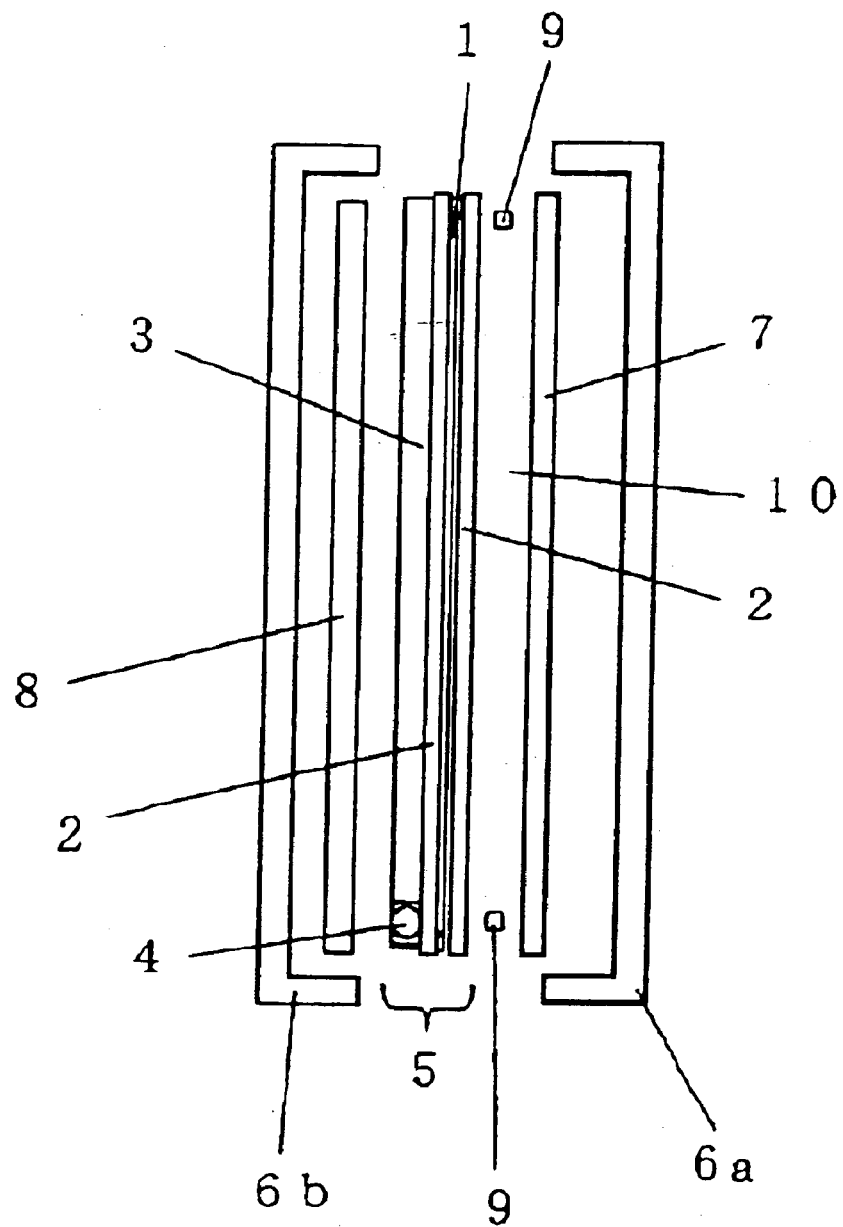
FIG. 1 is a sectional view of a liquid crystal display (LCD) device according to exemplary embodiment 1 of the present invention.

FIG. 1 is a sectional view of a liquid crystal display (LCD) device according to exemplary embodiment 1 of the present invention. The same elements as those in the conventional LCD device are denoted by the same reference numerals, and their explanation is omitted. Unlike the conventional device, the LCD device 6 according to embodiment 1 includes a heat insulating member 8 provided between an LCD unit 5 and a rear case 6b, and a transparent spacer 9 made of acrylic resin or the like provided between the display unit 5 and a translucent touch panel device 7. The display unit 5, the translucent touch panel device 7, and the spacer 9 form a closed space, which is filled with transparent still air 10. The heat insulating member 8 is made of urethane foam or melamine foam, and has a heat insulating effect.

Even when a side to the rear casing 6b (rear side) of the LCD device 6 is exposed to direct sunlight, the rear case 6b is heated to a high temperature. Since the heat is isolated by the heat insulating member 8, the heat is not transmitted to a liquid crystal material 1 through the light guide plate 3 and glass substrate 2. Even if a display side of the LCD unit is exposed to direct sunlight, the still air 10 functions as a heat insulating member, and prevents the heat absorbed by the translucent touch panel device 7 not to be transmitted to the liquid crystal material 1 through the glass substrate 2. This suppresses temperature rise of the liquid crystal material 1, thereby preventing the material from being dark and invisible.

According to embodiment 1, both the rear side and display panel side of the LCD device are exposed to direct sunlight, but only one side may be taken into consideration depending on usage condition the LCD device.

Exemplary Embodiment 2

Figure 2:
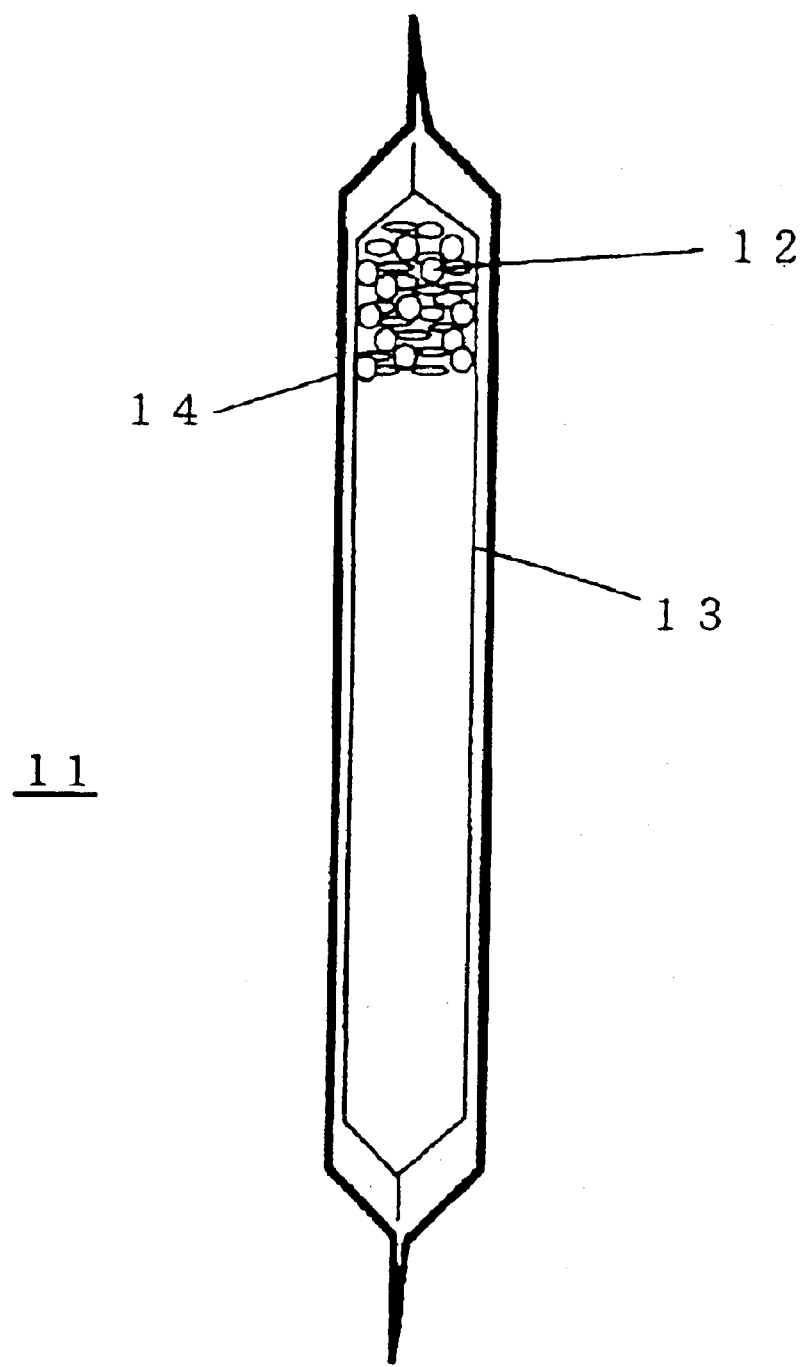
FIG. 2 is a sectional view of a heat insulating member in an LCD device according to exemplary embodiment 2 of the invention.

FIG. 2 is a sectional view of a heat insulating member used in a liquid crystal display (LCD) device according to exemplary embodiment 2 of the invention. The heat insulating member is replaced by the heat insulating member 8 of the LCD device 6 according to embodiment 1 in FIG. 1. The heat insulating member 11 includes amorphous powder 12 of silica or the like, a nonwoven cloth 13 for covering the powder, and an aluminum evaporated polyethylene film 14 for covering the nonwoven cloth 13. The inside of the polyethylene film 14 is depressurized to of 500 torr or less before having its end sealed by thermal compression. The polyethylene film 14, upon making its inside vacuum, allows the heat insulating member 11 to have a maximum heat insulating performance. The heat insulating member thus fabricated has a smaller heat conductivity than still air (having a heat conductivity of 0.026W/mK), and has a large heat insulation. The member suppresses the temperature rise of the liquid crystal material more than the heat insulating material of urethane foam or melamine foam. Therefore, even if the rear side of the LCD device 6 is exposed to direct sunlight, the display is avoided from dark or invisible display in a higher ambient temperature.

Exemplary Embodiment 3

Figure 3:
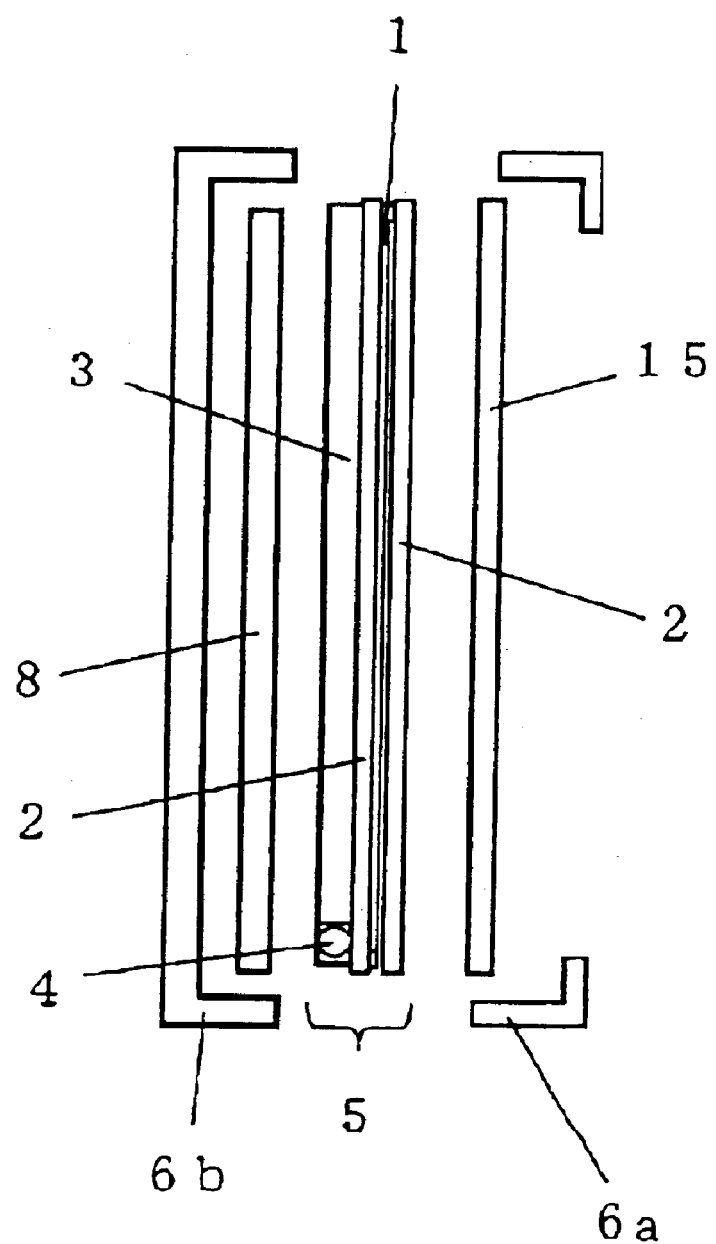
FIG. 3 is a sectional view of an LCD device according to exemplary embodiment 3 of the invention.
Figure 4:
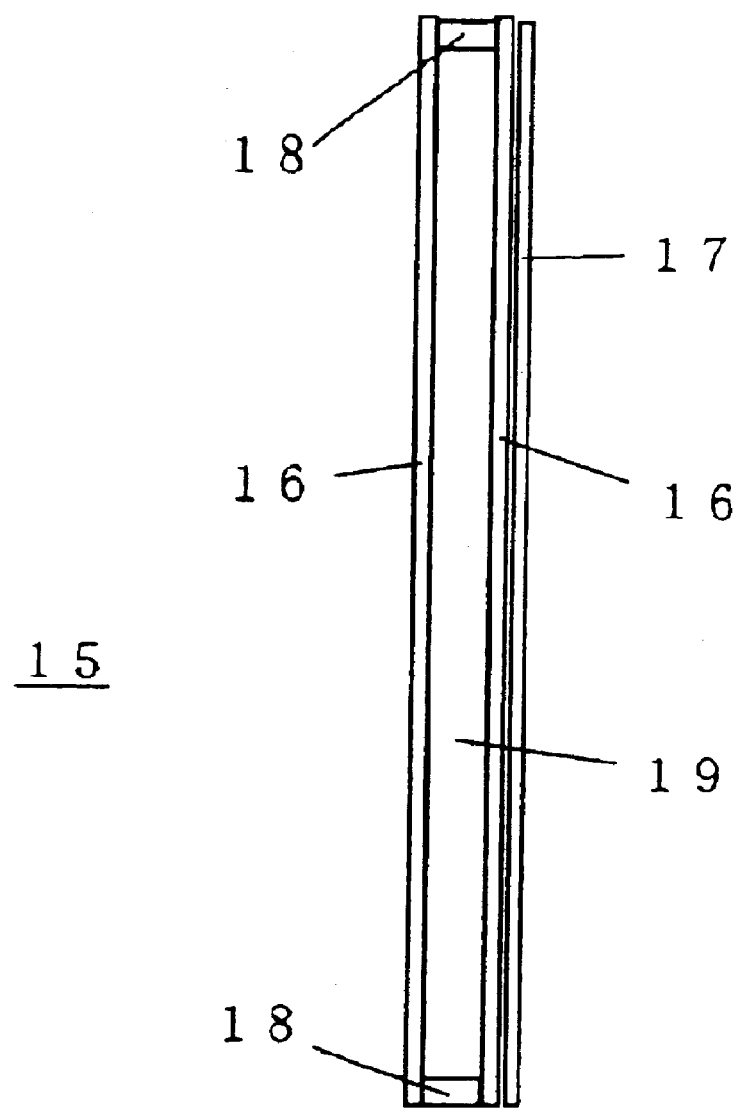
FIG. 4 is a sectional view of a heat insulating part in the LCD device according to embodiment 3.
Figure 5:
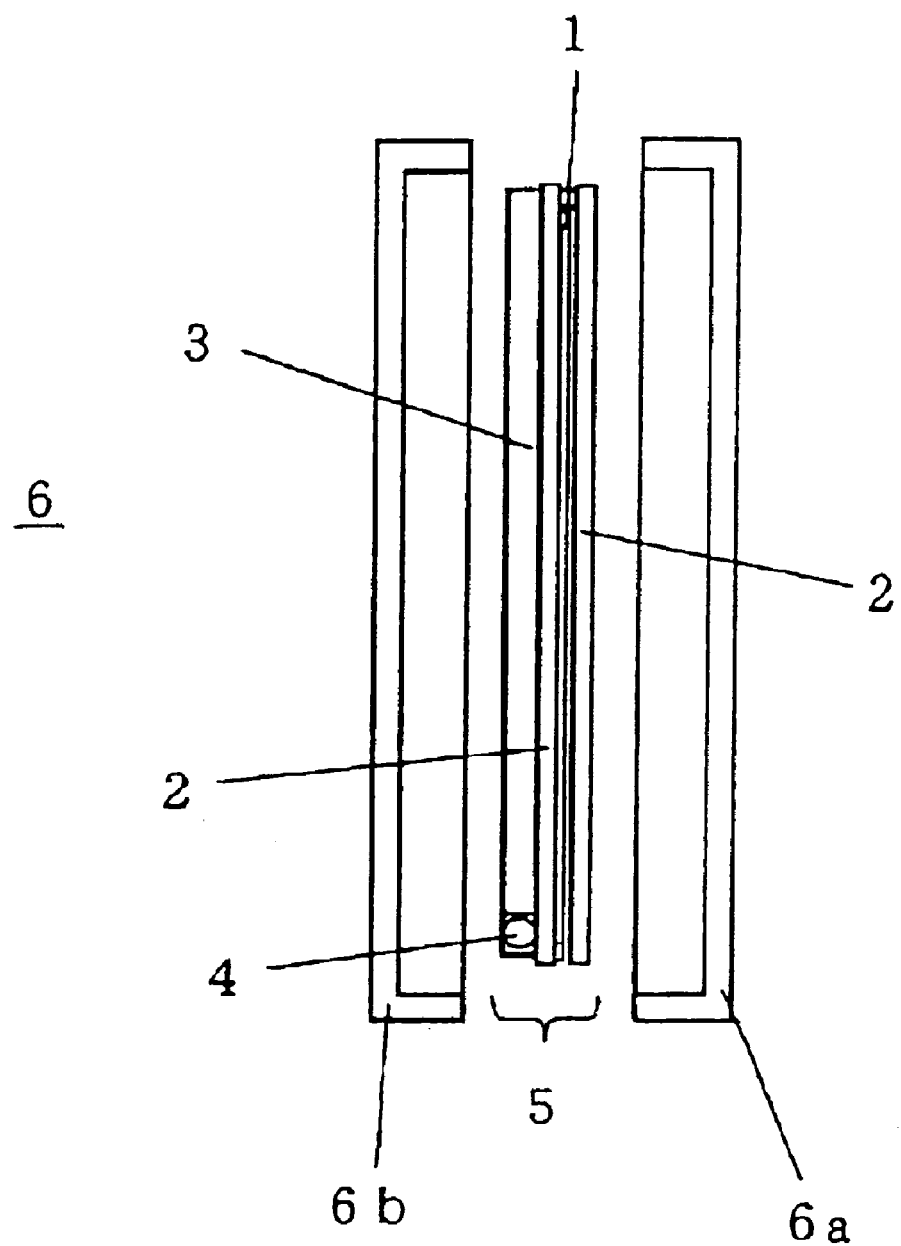
FIG. 5 is a sectional view of a conventional LCD device.
Figure 6:
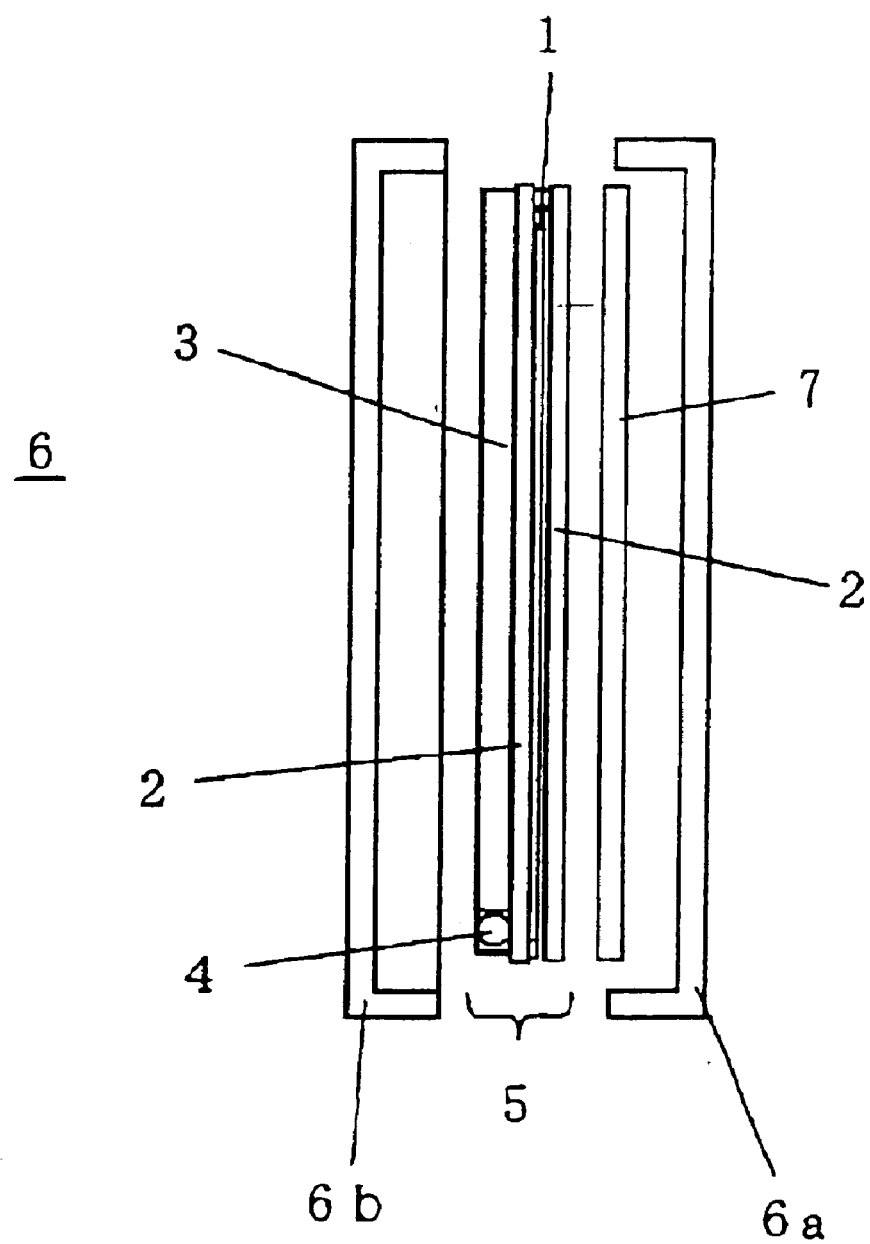
FIG. 6 is a sectional view of a conventional LCD device provided with a touch panel device.

FIG. 3 is a sectional view of a liquid crystal display (LCD) device according to exemplary embodiment 3 of the invention. The same elements as those in the conventional device are denoted by the same reference numerals, and their explanation is omitted. FIG. 4 is a sectional view of a heat insulating part used in the LCD device. The LCD device 6 according to embodiment 3, unlike the device according to embodiment 1 in FIG. 1, includes a heat insulating part 15 provided at a display side of the LCD unit 5. In FIG. 4, the heat insulating part 15 includes a transparent acrylic plate 16 parallel to the display side of the device. On the outermost surface, a transparent film 17 for passing visible light and absorbing radiation heat is adhered. A space enclosed by the acrylic plate 16 and members 18 for composing a plane perpendicular to the display side is completely sealed, and filled with transparent gas 19, and is maintained at a pressure of 500 torr or less. The gas 19 may be ordinary air, nitrogen, carbon dioxide, helium gas, argon gas, or other fluid being gas at ordinary temperature.

The decompressed gas 19 has a smaller heat conductivity than still air (having a heat conductivity of 0.026 W/mK), and has a large heat insulation. Therefore, even if the surface of the LCD unit 5 is exposed to direct sunlight, the gas 19 functions as a heat insulating member. The gas 19 and the film 17 absorbing radiation heat do not transmit the heat to the liquid crystal material 1 through the glass substrate 2. This suppresses temperature rise of the liquid crystal material 1, so that the device is prevented from dark and invisible display even at a higher ambient temperature.

The member 18 for composing the perpendicular plane in the heat insulating part 15 may not be transparent. A touch panel device may be disposed on a plane parallel to the display side.

What is claimed is:

1. A liquid crystal display (LCD) device comprising:
   a case;
   an LCD unit accommodated in said case; and
   a heat insulating member between said LCD unit and said case, said heat insulating member including a film housing having a sealed and decompressed interior.

2. The LCD device of claim 1, wherein said heat insulating member has a heat conductivity smaller than the heat conductivity (0.026 W/mK) of still air.

3. A liquid crystal display (LCD) device comprising:
   an LCD unit including a display side; and
   a first heat insulating member being transparent provided over said display side, said first heat insulating member including:
      a first transparent plate over said display side, and
      a second transparent plate over said display side, said second transparent plate providing a space between said first transparent plate and said second transparent plate.

4. The LCD device of claim 3, wherein said first heat insulating member has a heat conductivity smaller than the heat conductivity (0.026 W/mK) of still air.

5. The LCD device of claim 3, further comprising:
   a transparent member for absorbing radiation heat, disposed over said display side.

6. The LCD device of claim 5, wherein said transparent member is disposed between said display side and said first heat insulating member.

7. The LCD device of claim 3, wherein a pressure of said space is less than 500 torr.

8. The LCD device of claim 3, further comprising:
   a case for accommodating said LCD unit; and
   a second insulating member disposed between said LCD unit and said case.

9. The LCD device of claim 8, wherein said second heat insulating member has a heat conductivity smaller than the heat conductivity (0.026 W/mK) of still air.

10. The LCD device of claim 1, wherein said heat insulating member further includes a cloth container within said film housing, and a powder of silica contained within said cloth container.

* * * * *